United States Patent [19]
Hanji et al.

[11] Patent Number: 4,550,094
[45] Date of Patent: Oct. 29, 1985

[54] SOLID CATALYST COMPONENT FOR OLEFIN POLYMERIZATION

[75] Inventors: Katsumi Hanji, Funabashi; Kiyoshi Kawai, Toyonaka, both of Japan

[73] Assignee: Sumitomo Chemical Company, Limited, Osaka, Japan

[21] Appl. No.: 465,306

[22] Filed: Feb. 9, 1983

[30] Foreign Application Priority Data

Feb. 16, 1982 [JP] Japan .................................. 57-24075
Oct. 15, 1982 [JP] Japan .................................. 57-181668

[51] Int. Cl.$^4$ ........................... C08F 4/62; C08F 4/64; C08F 4/68
[52] U.S. Cl. ..................................... 502/110; 502/104; 502/113; 502/115; 502/116; 502/118; 502/119; 502/125; 502/126; 526/114; 526/116; 526/119; 526/127; 526/128
[58] Field of Search ............... 502/115, 116, 118, 125, 502/119, 113, 126, 110, 104

[56] References Cited

U.S. PATENT DOCUMENTS

| | | | |
|---|---|---|---|
| 4,109,071 | 8/1978 | Berger et al. | 502/113 X |
| 4,192,772 | 3/1980 | Berger et al. | 502/113 X |
| 4,226,964 | 10/1980 | Tanaka et al. | 502/113 X |
| 4,296,223 | 10/1981 | Berger | 502/134 X |
| 4,310,648 | 1/1982 | Shipley et al. | 502/113 X |
| 4,330,646 | 5/1982 | Sakurai et al. | 502/119 X |
| 4,431,568 | 2/1984 | Miya et al. | 502/119 |

FOREIGN PATENT DOCUMENTS 58787 5/1979 Japan .................................. 502/116
151704 3/1981 Japan .

Primary Examiner—Patrick P. Garvin
Attorney, Agent, or Firm—Stevens, Davis, Miller & Mosher

[57] ABSTRACT

A solid catalyst component for olefin polymerization comprising a hydrocarbon-insoluble product (III) obtained by reacting
(A) a silicon compound selected from the group consisting of
(1) silicon compounds represented by the general formula $R^1_aR^2_bR^3_cSi$, wherein $R^1$, $R^2$ and $R^3$ are each an alkyl, cycloalkyl, aralkyl, aryl, alkoxy, aryloxy, or hydroxyl group or a halogen or hydrogen atom; and a, b and c are numbers defined by the formulas $0 \leq a,b,c, \leq 4$ and $a+b+c=4$; and
(2) silicon compound containing the linkage Si-O-Si and polymers thereof with
(B) a compound of a transition metal of Groups IVa, Va and VIa of the periodic table to form a reaction mixture (I), further reacting the reaction mixture (I) with
(C) an organomagnesium compound selected from simple organomagnesium compounds and hydrocarbon-soluble complexes thereof with an organometallic compound capable of solubilizing said organomagnesium compounds to produce an intermediate product (II), and contacting the intermediate product (II) with
(D) a halogen-containing compound of a transition metal of Groups IVa, Va and VIa of the periodic table, to form the hydrocarbon-insoluble product (III).

60 Claims, No Drawings

SOLID CATALYST COMPONENT FOR OLEFIN POLYMERIZATION

This invention relates to a novel high-activity solid catalyst component for Ziegler catalyst system for use in olefin polymerization and, from a different viewpoint, to a process for the preparation of said solid catalyst component.

When an olefin is polymerized by using the solid catalyst component of this invention as the transition metal catalyst component of the Ziegler catalyst system, the polymer yields per unit quantity of the transition metal as well as per unit quantity of the solid catalyst component is so much increased that it becomes unnecessary to remove the catalyst residue from the polymerizate after completion of the polymerization. Moreover, the polymer build-up on the wall of polymerization vessel during polymerization is very little and there is formed in slurry or gas-phase polymerization a powdered polymer in the form of approximated sphere or elongated sphere (ellipsoid), which has a narrow particle size distribution, a high bulk density, and a desirable flowability. Further, according to this invention, it is possible to control the molecular weight of a polymer within the range from narrow to broad by suitably selecting the material ratio of components used in preparing the catalyst and the type of compounds of transition metals of Groups IVa, Va and VIa of the periodic table.

It is needless to say that in the production of olefin polymers, a highly active catalyst has a high utility value from the industrial viewpoint, because it eliminates the otherwise necessary step of removing the catalyst residue from the polymer after completion of the polymerization. However, it is to be noted that the catalyst activity should be evaluated on the weight basis of transition metal as well as solid catalyst. Most of the catalysts comprising a transition metal compound such as titanium tetrachloride supported on a carrier such as a magnesium compound, which have recently been actively developed, are unsatisfactory with respect to the polymerization activity per unit quantity of the solid catalyst. On the other hand, the polymer build-up on the wall of polymerization vessel should be as little as possible, because it causes various operation troubles which lead to a decrease in operation efficiency. In the case of slurry polymerization or gas-phase polymerization, it is desirable in view of the steadiness and efficiency of the operation that the polymer powder has a high bulk density, narrow particle size distribution, and good flowability (a property of the particles to flow). In view of the above requirements, in the production of olefin polymers, a polymerization catalyst of industrial superiority is such that it has a sufficiently high activity on the weight basis of transition metal and solid catalyst to omit the step of removing the catalyst residue, it causes little build-up of polymer on the wall of polymerization vessel, and it gives in slurry or gas-phase polymerization a polymer powder having a high bulk density and a high flowability. On the other hand, the molecular weight distribution of the resulting polymer is an important factor which controls the processability of the polymer as well as the appearance and physical properties of the fabricated articles. For instance, a polymer of narrow molecular weight distribution is suitable for injection molding or rotational molding, while that of broad molecular weight distribution is desirable for blow molding, extrusion molding, or film extrusion. Therefore, if it is possible to regulate easily the molecur weight distribution of a polymer by simple means, a great industrial advantage will be gained, because it then becomes possible to produce a wide variety of polymers suitable for particular uses.

It has been well known that a catalyst system (so-called Ziegler catalyst) comprising a combination of a compound of transition metals of Groups IVa to VIa of the periodic table and an organometallic compound of metals of Groups I to III is effective as the catalyst for olefin polymerization. These catalysts, however, do not always meet the above requirements and so cannot be called catalysts of industrial superiority, because of their low activity in general and, as a consequence, the necessity of removing the catalyst residue from the polymerizate after completion of the polymerization.

Concerning the Ziegler catalyst, various improvements have heretofore been published. For instance, catalytic systems comprising combinations of an organoaluminum compound and a reduction product of a transition metal compound in normal maximum valence state with an organomagnesium compound have been disclosed [Japanese Patent Application "Kokai" (Laid-open) Nos. 4,392/71, 4,393/71 and 11,695/72]. Other disclosed methods and catalyst systems include a polymerization method in which at least a major portion of a tetravalent titanium compound is reduced with the reaction mixture of an organoaluminum halide and an organomagnesium compound and the resulting reduction product is activated with an organoaluminum compound before and/or after feeding to the polymerization zone (Japanese Patent Publication No. 11,672/76); a gas-phase polymerization method employing a catalyst prepared by reducing a transition metal compound in maximum valence state with a reducing mixture of an aluminum halide compound and an organomagnesium compound and mixing the resulting product with an organoaluminum compound as activator (Japanese Patent Publication No. 39,468/75); a catalyst system comprising an organometallic compound and a catalyst component prepared by treating a solid reaction product of a transition metal compound and an organomagnesium compound with a Lewis acid [Japanese Patent Application "Kokai" (Laid-open) No. 126,785/75]; a polymerization method, in which there is used a catalyst comprising the reaction product of (1) a tetra- or trivalent titanium ester, (2) an organomagnesium compound, and (3) an organometal halide of a metal of Group IIIa of the periodic table [Japanese Patent Application "Kokai" (Laid-open) No. 143,883/75]; a catalyst system comprising an organoaluminum compound and a product of the reaction between a Grignard reagent and a reaction mixture of a silicon halide and a transition metal halide (Japanese Patent Publication No. 1,321/81); a catalyst system comprising an organometallic compound and a reaction product obtained by heating (1) a hydroxylated organic compound, (2) metallic magnesium, (3) an oxygen-containing organic compound of a metal of Groups IVa, Va and VIa of the periodic table, (4) a halogen-containing compound of a metal of Groups IVa, Va and VIa of the periodic table, and (5) an aluminum halide compound (Japanese Patent Publication No. 39,714/77); a catalyst system comprising an organoaluminum compound and a solid reaction product of (1) a dihalide of magnesium, calcium, manganese, or zinc, (2) an oxygen-containing organic compound of titanium, zirconium or vanadium, and (3) an organoaluminum halide (Japanese Patent Publication No. 37,195/76); a catalyst system comprising an organoaluminum compound and a solid catalyst compound obtained by the reaction of a mixture in a specified ratio of (1) an oxygen- or halogen-containing organic compound of magnesium, (2) an oxygen- or halogen-containing organic compound of titanium, (3) an oxygen- or halogen-containing organic compound of zirconium, and (4) an organoaluminum halide (Japanese Patent Publication No. 8,083/80); a catalyst system comprising an organometallic compound and a solid catalyst component obtained by reacting a halogen- or alkoxy-containing organoaluminum compound with a solid product derived from the reaction of a halogen-containing compound of titanium or vanadium with a reaction product of a hydropolysiloxane, a silicon compound containing an organic group and hydroxyl group bonded to the silicon atom, and a Grignard reagent (Japanese Patent Publication No. 7,443/80); and a catalyst system comprising an organometallic compound and a solid product obtained by the reaction of (1) at least one member selected from metallic magnesium and hydroxylated organic compounds, oxygen-containing organic compounds of magnesium, and halogen-containing magnesium compounds, (2) an oxygen-containing organic compound of titanium or a halogen-containing titanium compound, (3) an oxygen-containing organic compound of zirconium or a halogen-containing zirconium compound, (4) a silicon compound, and (5) an aluminum halide compound [Japanese Patent Application "Kokai" (Laid-open) No. 151,704/81]. These improved catalyst systems, however, are yet unsatisfactory from the industrial viewpoint with respect to polymerization activity and powder characteristics of the polymer. Moreover, a polymer of broad molecular weight distribution is not obtainable by use of these catalyst systems, except for those disclosed by Japanese Patent Publication Nos. 39,714/77 and 8,083/80 and Japanese Patent Application "Kokai" (Laid-open) No. 151,704/81.

The present inventors conducted an extensive study to develop a highly active and industrially advantageous catalyst for olefin polymerization and, as a result, found that a solid catalyst component having a high activity and other advantageous properties is obtained by reacting a silicon compound with a compound of a transition metal of Groups IVa, Va and VIa of the periodic table, further reacting the resulting reaction mixture with an organomagnesium compound, and contacting the resulting product with a halogen-containing compound of a transition metal of Groups IVa, Va and VIa of the periodic table to form a hydrocarbon-insoluble product to be used as the solid catalyst component; or by reacting a silicon compound with a compound of a transition metal of Groups IVa, Va and VIa of the periodic table, further reacting the resulting reaction mixture with an organomagnesium compound, then reacting the resulting reaction product with an organoaluminum halide compound represented by the general formula $R^4_lAlX_{3-l}$ (wherein $R^4$ is an organic group having 1 to 20 carbon atoms, X is a halogen atom, and l is a number defined by the formula $0<l<3$), and contacting the resulting reaction product with a halogen-containing compound of a transition metal of Groups IVa, Va and VIa of the periodic table to form a hydrocarbon-insoluble product to be used as the solid catalyst component. The solid catalyst component thus obtained is highly active, is effective in reducing the polymer build-up on the wall of polymerization vessel, and permits of easy control of molecular weight distribution of the polymer. When the slurry or gas-phase polymerization is carried out in the presence of this solid catalyst component, there is obtained a polymer powder of narrow particle size distribution comprising approximately spherical or elongated spherical particles having a high bulk density and good flowability. The present invention has been accomplished based on the above finding.

An object of this invention is to provide a novel solid catalyst component for olefin polymerization.

Other objects and advantages of this invention will become apparent from the following description.

According to this invention, there is provided 1. a solid catalyst component for olefin polymerization comprising a hydrocarbon-insoluble product (III) obtained by reacting (A) a silicon compound selected from the group consisting of (1) silicon compounds represented by the general formula $R^1_aR^2_bR^3_cSi$, wherein $R^1$, $R^2$ and $R^3$ are each an alkyl, cycloalkyl, aralkyl, aryl, alkoxy, aryloxy, or hydroxyl group or a halogen or hydrogen atom; and a, b and c are numbers defined by the formulas $0 \leq a \leq 4$, $0 \leq b \leq 4$, $0 \leq c \leq 4$ and $a+b+c=4$; and (2) silicon compounds containing the linkage Si-O-Si and polymers thereof with (B) a compound of a transition metal of Groups IVa, Va and VIa of the periodic table to form a reaction mixture (I), further reacting the reaction mixture (I) with (C) an organomagnesium compound selected from simple organomagnesium compounds and hydrocarbon-soluble complexes thereof with an organometallic compound capable of solubilizing said organomagnesium compounds to produce an intermediate product (II), and contacting the intermediate product (II) with (D) a halogen-containing compound of a transition metal of Groups IVa, Va and VIa of the periodic table, to form the hydrocarbon-insoluble product (III); or 2. a solid catalyst component for olefin polymerization obtained by reacting said intermediate product (II) with (E) an organoaluminum halide represented by the general formula $R^4_lAlX_{3-l}$, wherein $R^4$ is an organic group having 1 to 20 carbon atoms, X is a halogen atom, and l is a number defined by the formula $0<l<3$, and contacting the resulting reaction product (IV) with (D) a halogen-containing compound of a transition metal of Groups IVa, Va and VIa of the periodic table.

The silicon compounds used as the component (A)(1) according to this invention are those represented by the general formula $R^1_aR^2_bR^3_cSi$, wherein $R^1$, $R^2$ and $R^3$ are each an alkyl, cycloalkyl, aralkyl, aryl, alkoxy, aryloxy, or hydroxy group or a halogen or hydrogen atom and a, b and c are numbers defined by the formulas $0 \leq a,b,c \leq 4$ and $a+b+c=4$. As examples, mention may be made of $Si(OCH_3)_4$, $Si(OC_2H_5)_4$, $Si(OC_3H_7)_4$, $Si(OC_4H_9)_4$, $Si(OC_6H_5)_4$, $SiCl_4$, $SiBr_4$, $Si(OC_2H_5)_3Cl$, $Si(OC_2H_5)_2Cl_2$, $Si(OC_2H_5)Cl_3$, $HSiCl_3$, $CH_3SiCl_2H$, $C_2H_5SiCl_3$, $C_6H_5SiCl_3$, $(CH_3)_2SiCl_2$, $(C_2H_5)_3SiOH$, $(C_2H_5)_2Si(OH)_2$, $(C_6H_5)_2Si(OH)_2$, and $C_4H_9Si(OH)_3$. Preferable silicon compounds are those of the general formula, wherein $R^1$ is an alkoxy or aryloxy group, $R^2$ is a halogen atom, $0 \leq a,b \leq 4$, $a+b=4$ and $c=0$. Most preferred are tetraalkoxysilanes such as $Si(OC_2H_5)_4$ and silicon tetrahalides such as $SiCl_4$.

The silicon compounds used as the component (A)(2) are those having at least one Si—O—Si linkage or polymers thereof. Examples include $Si_2OCl_6$, hexamethyldisiloxane, tetramethyldisiloxane, trimethylcyclotrisiloxane, dimethylpolysiloxane, diphenylpolysiloxane, methylhydropolysiloxane, phenylhydropolysiloxane, chlorophenylpolysiloxane, ethoxyhydropolysiloxane, and polysilanols. The polymers may have any of the chain, cyclic, and reticulate structures and any of the polymerization degrees.

The compounds of transition metals ($M^1$) of Groups IVa, Va and VIa of the periodic table, used as the components (B), are those represented by the general formula $[M^1O_p(OR^5)_qX_r]_m$, wherein $R^5$ is an alkyl, cycloalkyl, aryl, aralkyl, alkenyl, or acyl group or substitution derivative thereof having 1 to 20 carbon atoms, X is a halogen atom, p is a number defined by the formula $0 \leq p \leq 1.5$, q and r are numbers defined by the formulas $0 \leq q \leq 4$ and $0 \leq r \leq 4$, respectively, and m is an integer. Preferable compounds are those of the general formula in which $0 \leq p \leq 1$ and $1 \leq m \leq 10$. $M^1$ is selected preferably from titanium, vanadium, zirconium, and hafnium, most preferably from titanium and zirconium. Examples of the compounds (B) include $Ti(OC_2H_5)_4$, $Ti(O-n-C_3H_7)_4$, $Ti(O-iso-C_3H_7)_4$, $Ti(O-n-C_4H_9)_4$, $Ti(O-sec-C_4H_9)_4$, $Ti(O-tert-C_4H_9)_4$, $Ti(OC_6H_5)_4$, $Ti(OC_6H_4CH_3)_4$, $Ti(OC_6H_4Cl)_4$, $TiO(OC_2H_5)_2$,

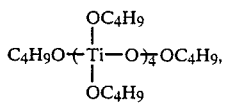

$TiOCl_2$, $Ti(OC_2H_5)_3Cl$, $Ti(OC_2H_5)_2Cl_2$, $Ti(OC_2H_5)Cl_3$, $Ti(OC_6H_5)Cl_3$, $TiCl_4$, $TiBr_4$, $Zr(OC_2H_5)_4$, $Zr(O-n-C_3H_7)_4$, $Zr(O-iso-C_3H_7)_4$, $Zr(O-n-C_4H_9)_4$, $Zr(O-sec-C_4H_9)_4$, $Zr(O-tert-C_4H_9)_4$, $Zr(OC_6H_5)_4$, $Zr(OC_6H_4CH_3)_4$, $Zr(OC_6H_4Cl)_4$, $ZrO(OC_2H_5)_2$,

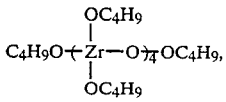

$ZrOC_2$, $Zr(OC_2H_5)_3Cl$, $Zr(OC_2H_5)_2Cl_2$, $Zr(OC_2H_5)Cl_3$, $ZrCl_4$, $ZrBr_4$, $VOCl_3$, $VCl_4$, $VO(OC_2H_5)_3$, $VO(O-iso-C_3H_7)_3$, $VO(O-n-C_4H_9)_3$, $VO(O-iso-C_4H_9)_3$, and $HfCl_4$. Of these compounds, especially preferred are those of the above formula in which $r=0$. It is also possible to use a combination of two or more compounds (B). By use of a combination of two or more compounds of different transition metals ($M^1$), it is possible to obtain a solid catalyst component which gives a polymer of broad molecular weight distribution. A combination suitable for this purpose is that of Ti and Zr compounds. The suitable atomic ratio, Ti:Zr, is generally from 1:50 to 50:1, preferably from 1:20 to 20:1, most preferably from 1:10 to 10:1.

The organomagnesium compound (C) may be any of the organomagnesium compounds having a magnesium-carbon bond. Especially preferred are Grignard compounds represented by the general formula $R^6MgX$, wherein $R^6$ represents a hydrocarbon radical of 1 to 20 carbon atoms and X represents a halogen atom and dialkylmagnesium compounds or diarylmagnesium compounds represented by the general formula $R^7R^8Mg$, wherein $R^7$ and $R^8$, which may be the same or different, represent each a hydrocarbon radical having 1 to 20 carbon atoms. The organic groups $R^7$ and $R^8$ include those alkyl, aryl, aralkyl and alkenyl groups which have 1 to 20 carbon atoms such as methyl, ethyl, n-propyl, isopropyl, n-butyl, sec-butyl, tert-butyl, n-amyl, isoamyl, n-hexyl, n-octyl, 2-ethylhexyl, phenyl, and benzyl. Examples of individual Grignard compounds include methylmagnesium chloride, ethylmagnesium chloride, ethylmagnesium bromide, ethylmagnesium iodide, n-propylmagnesium chloride, n-propylmagnesium bromide, n-butylmagnesium chloride, n-butylmagnesium bromide, sec-butylmagnesium chloride, sec-butylmagnesium bromide, tert-butylmagnesium chloride, tert-butylmagnesium bromide, n-amylmagnesium chloride, isoamylmagnesium chloride, phenylmagnesium chloride, and phenylmagnesium bromide. Examples of the compounds of the formula $R^7R^8Mg$ are diethylmagnesium, di-n-propylmagnesium, diisopropylmagnesium, di-n-butylmagnesium, di-sec-butylmagnesium, di-tert-butylmagnesium, n-butyl-sec-butylmagnesium, di-n-amylmagnesium, and diphenylmagnesium. Alkyl- or aryl-magnesium-alkoxides or -aryloxides may also be used as organomagnesium compound.

The solvents generally used in the synthesis of the above organomagnesium compounds are those of the ether type such as, for example, diethyl ether, di-n-propyl ether, diisopropyl ether, di-n-butyl ether, diisobutyl ether, di-n-amyl ether, diisoamyl ether, di-n-hexyl ether, di-n-octyl ether, diphenyl ether, dibenzyl ether, phenetole, anisole, tetrahydrofuran, and tetrahydropyran. It is also possible to use hydrocarbon solvents such as, for example, hexane, heptane, octane, cyclohexane, methylcyclohexane, benzene, toluene, and xylene, or mixtures of these hydrocarbons and ethers. The organomagnesium compound is used preferably in the form of ether solution or ether complex. It is advantageous to the production of polymer particles in the form of approximated sphere or elongated sphere having a narrow particle size distribution to use an ether having 6 or more carbon atoms or a cyclic ether. It is preferred to use a Grignard compound of the formula $R^6MgCl$ in the form of an ether solution or ether complex. It is also possible to use as the component (C) a hydrocarbon-soluble complex of an organomagnesium compound with an organometallic compound capable of solubilizing the organomagnesium compound. Examples of such organometallic compounds are those of lithium, beryllium, boron, aluminum or zinc.

The compounds of transition metals ($M^2$) of Groups IVa, Va and VIa of the periodic table, used as the component (D) may be those represented by the general formula $]M^2O_s(OR^9)_tX_u]_n$, wherein $R^9$ is an alkyl, cycloalkyl, aryl, aralkyl, alkenyl, or acyl group or substitution derivative thereof having 1 to 20 carbon atoms, X is a halogen atom, s is a number defined by the formula $0 \leq s \leq 1.5$, t is a number defined by the formula $0 \leq t \leq 3$, u is a number defined by the formula $1 \leq u \leq 4$, and n is an integer. It is preferable to use those compounds of the general formula in which $0 \leq s \leq 1$ and $1 \leq n \leq 10$. $M^2$ is selected preferably from titanium, vanadium, zirconium and hafnium, most preferably from titanium and zirconium. Examples of the compounds used as the component (D) include those halogen-containing compounds which are listed above among the examples of compounds used as the component (B). Especially preferred are titanium halides, particularly titanium tetrachloride. It is also possible to use a combination of two or more compounds as the component (D). A polymer of broad molecular weight distribution is obtained by using a component (D) containing a transition metal ($M^2$) different from that ($M^1$) contained in the component (B).

The organoaluminum halides used as the component (E) are those represented by the general formula $R^4_l AlX_{3-l}$, wherein $R^4$ represents an organic radical, particularly a hydrocarbon radical, having 1 to 20, preferably 1 to 6, carbon atoms, X represents a halogen atom, and l is a number defined by the formula $0 \leq l \leq 3$. X is preferably a chlorine atom, and l is preferably a number defined by $1 \leq l \leq 2$, most preferably $l = 1$. $R^4$ is selected preferably from alkyl, cycloalkyl, aryl, aralkyl, and alkenyl groups. As examples of component (E), mention may be made of ethylaluminum dichloride, isobutylaluminum dichloride, ethylaluminum sesquichloride, isobutylaluminum sesquichloride, diethylaluminum monochloride, and isobutylaluminum monochloride. Of these compounds, particularly preferred are alkylaluminum dichlorides such as ethylaluminum dichloride and isobutylaluminum dichloride. A mixture of two or more different organoaluminum halides as component (E) may also be used. It is also possible to adjust the halogen content by use of a trialkylaluminum such as triethylaluminum or triisobutylaluminum or a trialkenylaluminum in combination with an organoaluminum halide.

The synthesis of a solid catalyst component is carried out always under an inert gas atmosphere such as nitrogen or argon. The reaction between a silicon compound [component (A)] and a compound of a transition metal of Groups IVa, Va and VIa of the periodic table [component (B)] is allowed to proceed either without using a reaction medium or in a suitable solvent or diluent at a temperature of generally −50° to 150° C. for several minutes to several hours. The order of the addition of both reactants is free of restriction, namely, (A) may be added to (B) or (B) may be added to (A) or both may be added simultaneously to the reaction medium. The ratio of (A) in terms of silicon atom to (B) in terms of transition metal ($M^1$) atom is from 1:50 to 50:1, preferably from 1:20 to 20:1, most preferably from 1:10 to 10:1. Examples of the solvents suitable as the reaction media include aliphatic hydrocarbons such as pentane, hexane, heptane, and octane, aromatic hydro carbons and its derivatives such as benzene, toluene, xylene, and chlorobenzene, alicyclic hydrocarbons such as cyclohexane and cyclopentane, and ethers such as diethyl ether, dibutyl ether, and tetrahydrofuran. These solvents are used each alone or in combinations. The reaction mixture (I) is generally a homogeneous solution, but occasionally contains insoluble matters.

The reaction mixture (I) is then allowed to react with an organomagnesium compound (C) to obtain an intermediate product (II). This reaction proceeds by mixing the reaction mixture (I) and the reactant (C) as such or in a suitable solvent or diluent and keeping the resulting mixture at generally −70° to 150° C., preferably −30° to 50° C. for several minutes to several hours, preferably for 30 minutes to 5 hours. The order of the addition of both reactants is free of restriction, namely, (I) may be added to (C) or (C) may be added to (I) or both may be added simultaneously to the reaction medium. The ratio of (I) in terms of the sum of silicon atom and transition metal atom to (C) in terms of magnesium atom is from 1:10 to 10:1, preferably from 1:5 to 5:1, most preferably from 1:2 to 2:1. Examples of the solvents suitable as the reaction media include aliphatic hydrocarbons such as pentane, hexane, heptane and octane, aromatic hydrocarbons such as benzene, toluene and xylene, alicyclic hydrocarbons such as cyclohexane and cyclopentane, and ethers such as ethyl ether, dibutyl ether, tetrahydrofuran, and dioxane. These solvents are used each alone or in combinations.

The intermediate product (II) thus obtained is, in most cases, a solid substance insoluble in the solvent, but is sometimes obtained as dissolved in the reaction medium, depending on the type of reactants and the solvent. The product in the solution form can be isolated as a solid by precipitating from the solution with a precipitant, by the temperature change, removal of the solvent by distillation, or reprecipitation.

The intermediate product (II) is then contacted with the component (D) either without being isolated or after having been isolated by evaporation of the reaction mixture to dryness or by filtration followed by drying or by filtration and subsequent thorough washing with a solvent. Alternatively, the intermeidate product (II) is allowed to react with the component (E), and then the resulting product is contacted with the component (D). The contact is effected either directly in the absence of a solvent or in a solvent or diluent at a temperature of generally −70° to 200° C., preferably −30° to 150° C., most preferably 30° to 140° C. for several minutes to several hours. The order of the addition of both reactants is free of any restriction, namely, (D) may be added to (II), or (II) may be added to (D) or both may be added simultaneously to the reaction medium. The ratio between (II) and (D) can be selected from a wide range.

If the amount of component (D) relative to intermediate product (II) is too small, the effect of the contact with component (D) is hardly exhibited, whereas if the component (D) is used in excess of the necessary amount, no additional advantage is gained. By changing the ratio between the intermediate product (II) and the component (D), it is possible to adjust the molecular weight distribution of the polymer. It is generally desirable to select the amount of (D) from the range of 0.01 to 10 mols for 1 g of the intermediate product (II). The solvents used in the reaction include aliphatic hydrocarbons such as, for example, pentane, hexane, heptane and octane; halohydrocarbons such as carbon tetrachloride and dichloroethane; aromatic hydrocarbons and its derivatives such as benzene, toluene, xylane, and chlorobenzene, and alicyclic hydrocarbons such as cyclohexane and cyclopentane. These solvents are used each alone or in mixtures.

The reaction between the intermediate product (II) and the component (E) is carried out by mixing both reactants as such or dissolved in or diluted with a suitable solvent and treating the mixture at a temperature of generally from −70° to 200° C., preferably from −30° to 150° C., most preferably from 30° to 100° C., for several minutes to several hours. The order of addition of the reactants is not critical. The component (E) may be added to the intermediate product (II), or vice versa, or both reactants may be added simultaneously to a reaction medium. The ratio between the intermediate product (II) and the component (E) may be selected from a wide range. By varying the ratio, it is possible to adjust the molecular weight distribution of the polymer. In general, with the increase in the ratio of component (E) to intermediate product (II), the molecular weight distribution of the polymer becomes broader. It is generally preferred to select the amount of component (E) in terms of the halogen atom from the range of 0.01 to 0.1 gram equivalent for 1 g of the intermediate product (II). The examples of solvents used in the reaction include aliphatic hydrocarbons such as pentane, hexane, heptane, and octane; halohydrocarbons such as carbon tetrachloride and dichloroethane; aromatic hydrocarbons and its derivatives such as benzene, toluene, xylene and chlorobenzene; and alicyclic hydrocarbons such as cyclohexane and cyclopentane. These solvents are used each alone or in mixtures.

Before contacting with the component (D), the reaction product (IV) formed from the intermediate product (II) and the component (E) is usually collected by filtration and used as such or after drying, or after thorough washing with a solvent followed by drying or without drying. The contact between the reaction product (IV) and the component (D) is effected by intermixing both materials as such or dissolved in or diluted with a suitable solvent, and keeping the mixture at a temperature of genrally −70° to 200° C., preferably −30° to 150° C., most preferably 30° to 140° C., for several minutes to several hours. The order of the addition of both materials is not critical. The component (D) may be added to the reaction product (IV), or vice versa, or both may be mixed together all at a time. The ratio between both materials may be selected from a wide range. However, if the amount used of the component (D) relative to the amount of the reaction product (IV) is too small, the effect of the contact is hardly exhibited, whereas if it is in excess of the necessary amount, no additional advantage will be gained. By varying the ratio, it is possible to adjust the molecular weight distribution of the polymer. In general, a suitable amount of the component (D) for 1 g of the reaction product (IV) is 0.01 mmole to 1 mol, preferably 0.1 mmol to 0.1 mol, most preferably 1 mmol to 0.1 mol. Examples of the solvents used in the reaction include aliphatic hydrocarbons such as pentane, hexane, heptane, and octane, halohydrocarbons such as carbon tetrachloride and dichloroethane, aromatic hydrocarbons and its derivatives such as benzene, toluene, xylene, and chlorobenzene, and alicyclic hydrocarbons such as cyclohexane and cyclopentane. These solvents are used alone or in mixtures.

The hydrocarbon-insoluble product (III) thus prepared is a powder comprising approximately spherical or elongated spherical particles of narrow particle size distribution and good flowability. It contains magnesium, a transition metal of Grops IVa, Va and VIa of the periodic table, and a halogen atom. It is generally amorphous or feebly crystalline, showing, in most cases, scarcely any X-ray diffraction peak or only very broad or feeble diffraction peaks at interplanar spacings (d) of around 5.9, 2.8 and 1.8Å. The hydrocarbon-insoluble product (III) is usually collected by filtration, washed thoroughly with a hydrocarbon diluent, and used, either as such or after drying, as solid catalyst component for olefin polymerization.

In polymerizing or copolymerizing an olefin, the hydrocarbon-insoluble reaction product (III) according to this invention is used in combination with an organometallic compound of a metal of Groups I, II and III of the perodic table. As examples of such organometallic compounds, mention may be made of organoaluminum compounds including trialkylaluminums such as triethylaluminum, tri-n-propylaluminum, tri-n-butylaluminum, triisobutylaluminum, and tri-n-hexylaluminum; dialkylaluminum monohalides such as di-ethylaluminum monochloride, di-n-propylaluminum monochloride, di-n-butylaluminum monochloride, diisobutylaluminum monochloride, and di-n-hexylaluminum monochloride; alkylaluminum dihalides such as ethylaluminum dichloride, n-propylaluminum dichloride, n-butylaluminum dichloride, isobutylaluminum dichloride, and n-hexylaluminum dichloride; alkylaluminum sesquihalides such as ethylaluminum sesquichloride, n-propylaluminum sesquichloride, n-butylaluminum sesquichloride, isobutylaluminum sesquichloride, and n-hexylaluminum sesquichloride; trialkenyl aluminums such as triisoprenylaluminum; alkoxyaluminums such as diethylaluminum ethoxide, dibutylaluminum butoxide, ethylaluminum sesquiethoxide, and butylaluminum sesquibutoxide; alkoxyaluminum halides such as ethylaluminum ethoxychloride and butylaluminum butoxychloride; alkylaluminum hydrides such as diethylaluminum hydride, dibutylaluminum hydride, ethylaluminum dihydride, and butylaluminum dihydride; organozinc compounds such as diethylzinc; organomagnesium compound such as diethylmagnesium and ethylmagnesium chloride; and $LiAl(C_2H_5)_4$. Of these compounds, especially prefered are trialkylaluminums, alkylaluminum halides, or mixtures thereof.

The solid catalyst component of this invention is suitable for use in the polymerization of terminally unsaturated olefins having 2 to 20, preferably 2 to 10, carbon atoms such as, for example, ethylene, propylene, butene-1, 4-methylpentene-1, hexene-1 and octene-1. It is also suitable for the copolymerization of two or more of these olefins and the copolymerization of these olefins with diolefins having 4 to 20 carbon atoms such as, for example, 1,4-hexadiene, 1,7-octadiene, vinylcyclohexene, 1,3-divinylcyclohexene, cyclopentadiene, 1,5-cyclooctadiene, dicyclopentadiene, norbornadiene, 5-vinylnorbornene, ethylidenenorbornene, butadiene, and isoprene. The present solid catalyst component is advantageously adaptable especially to the homopolymerization of ethylene or copolymerization of 90 mole-% or more of ethylene with other olefins such as preferably propylene, butene-1, 4-methylpentene-1, hexene-1, and octene-1. For the purpose of adjusting the stereoregularity and molecular weight distribution, an electron-donating compound such as those containing nitrogen, oxygen, or phosphorus can be added to the polymerization system.

The polymerization can be carried out by the customary method of slurry polymerication, gas-phase polymerization, solution polymerization, or melt polymerization. When the method of slurry polymerization, or gas-phase polymerization is used, there is obtained a polymer powder in the particle form of approximated sphere or elongated sphere, corresponding to the desirable particle form of the present solid catalyst component, and the polymer powder has a narrow particle size distribution, a high bulk density, and a good flowability.

The polymerization temperature is generally from room temperature to 200° C., preferably 40° to 150° C. and the polymerization pressure is from atmospheric to 100 atmospheres, preferably atmospheric to 50 atmospheres, though the polymerization proceeds normally at higher temperatures and pressures. It is possible to use a molecular weight regulator such as, for example, hydrogen. The polymerization is carried out either continuously or batchwise. It is also feasible to carry out multi-stage polymerization using a solid catalyst component of this invention by means of a combination of multiple reaction zones of different polymerization conditions. A sufficient concentration of the present solid catalyst component in the polymerization system is usually 0.001 to 1 millimoles of the transition metal atom per 1 liter of the reaction medium or of the polymerization vessel. The organometallic compound as catalyst component is used in an amount within range of 0.5 to 500, preferably 2 to 100, mole equivalents per mole of transition metal atom in the solid catalyst component. The inert solvents used as polymerization solvent in slurry polymerization and solution polymerization include aliphatic hydrocarbons such as propane, butane, pentane, hexane, heptane, and octane and alicyclic hydrocarbons such as cyclohexane and cycloheptane. It is also possible to use as the polymerization solvent the polymerizable monomers such as ethylene, propylene, butene-1, 4-methylpentene-1, hexene-1, and octene-1 themselves.

When the present solid catalyst component is used in the olefin polymerization, owing to a high activity of the catalyst per unit quantity of the transition metal as well as per unit quantity of the solid catalyst, the residual catalyst content of the resulting polymer becomes so small that the step of its removal is unnecessary; moreover the polymer build-up on the wall of polymerization vessel is much reduced. When slurry polymerization or gas-phase polymerization is carried out, there is formed a polymer powder comprising approximately spherical or elongated sphere-like particles having a narrow particle size distribution and a desirable flowability, which no longer requires pelletization. Thus, the polymerization efficiency is high and the operation steps are simplified. Since the molecular weight distribution of the resulting polymer can be controlled by properly selecting the type and quantity of each component used in the preparation of the present solid catalyst component, it is possible to prepare various polymers suitable for a wide range of specific uses such as injection molding, rotational molding, extrusion molding, film extrusion, and blow molding.

The invention is further illustrated below in detail with reference to Examples, but the invention is not limited thereto, unless it departs from the essential feature of the invention. In Examples, the polymer properties were tested as described below.

The density and bulk density were tested according to the methods specified in JIS K 6760 and K 6721, respectively.

The melt flow ratio (MFR) was used as a measure for the melt flowability. According to the method for testing melt index specified in ASTM D 1238-57T, MFR is expressed as a ratio of the flow rate under a load of 2.160 kg to that (MI) under a load of 21.60 kg:

$$MFR = \frac{\text{Flow rate under 21.60 kg load}}{\text{Flow rate under 2.160 kg load}}$$

It has been known that, in general, the broader the molecular weight distribution, the larger the value of MFR.

EXAMPLE 1

(1) Synthesis of organomagnesium compound

Into a 1-liter flask provided with a stirrer, reflux condenser, dropping funnel, and thermometer, was placed 32.0 g of magnesium turnings for Grignard reagent. After removing the air and moisture from the flask by the thorough flushing with nitrogen, 120 g of n-butyl chloride and 500 ml of di-n-butyl ether were charged into the dopping funnel. About 30 ml of the mixture in the dropping funnel was added dropwise onto the magnesium to initiate the reaction. The dropwise addition of the remainder of the mixture was continued at 50° C. for about 4 hours. After completion of the addition, the mixture in the flask was allowed to react for another hour at 60° C. The reaction mixture was then cooled down to room temperature and the insolubles were removed by filtration. The concentration of n-butylmagnesium chloride in the di-n-butyl ether (filtrate) was found to be 2.03 moles/liter, as determined by the hydrolysis of n-butylmagnesium chloride with 1N sulfuric acid followed by the back-titration with 1N aqueous sodium hydroxide solution using phenolphthalin as the indicator.

(2) Syntheses of reaction mixture (I) and intermediate product (II)

To a solution of 3.00 g (8.78 mmol) of Ti(O-n-$C_4H_9$)$_4$ in 30 ml of n-heptane, was added 5.49 ml [8.78 mmol of Zr(o-n-$C_4H_9$)$_4$] of a solution of Zr(O-n-$C_4H_9$)$_4$ in n-heptane. To the mixture, after having been stirred for 15 minutes at room temperature, was added dropwise at room temperature 9.15 g (43.9 mmol) of Si(O$C_2H_5$)$_4$ over a period of 15 minutes. The mixture was then stirred at room temperature for 20 minutes to yield the reaction mixture (I) as a pale yellow homogeneous solution. To the reaction mixture (I), while being cooled at 5° C., was added dropwise over a period of 35 minutes 30.3 ml (61.5 mmol) of a solution of n-$C_4H_9$MgCl in n-butyl ether prepared above in (1). With the dropwise addition, the reaction mixture turned brown and a solid product precipitated out. After completion of the dropwise addition, the reaction was allowed to continue for further two hours. After removing the liquid phase, by filtration the solid product was washed 5 times with 120 ml of n-heptne, and dried at room temperature under reduced pressure to yield 10.6 g of the intermediate product (II) as a brown powder. Elementary analysis: 3.2% Ti, 6.1% Zr, 12.4% Mg, 17.1% Cl, and 0.7% of (n-$C_4H_9$)$_2$O (all percentages are by weight).

(3) Synthesis of solid catalyst component

To 5.0 g of the intermediate product (II) prepared above in (2), was added at room temperature dropwise over a period of 30 minutes 15 ml of TiCl$_4$. After completion of the dropwise addition, the reaction was allowed to continue for another hour at 100° C. After completion of the reaction and removal of the liquid phase by filtration, the solid product was washed 5 times with 80 ml of n-heptane, and dried at room temperature under reduced pressure to yield 4.7 g of the reaction product (III) as a brown powder. Upon analysis, the reaction product (III) was found to contain 6.5% Ti, 5.4% Zr, 12.2% Mg, and 65.0% Cl. The X-ray diffraction pattern of this powder showed only weak broad diffraction peaks in the vicinity of interplanar spacings (d) of 5.9, 2.8 and 1.8 Å. The microscopic observation revealed that the powder particles were approximately spherical and showed a narrow particle size distribution.

(4) Polymerization of ethylene

Into a 1-liter autoclave provided with an electromagnetic induction stirrer, which had been thoroughly flushed with nitrogen, were added 500 ml of n-heptane and 1.0 mmol of triisobutylaluminum. Into the autoclave, after the temperature had been elevated to 80° C., was charged hydrogen to a total pressure of 3 kg/cm² followed by ethylene to a total pressure of 13 kg/cm². The polymerization was initiated by the addition of 3.3 mg of the solid catalyst component prepared above in (3). Ethylene was continuously fed to the autoclave to maintain the total pressure constant at 80° C. for one hour. After the addition of 2 ml of isobutyl alcohol to terminate the polymerization, the polymer which was formed was collected by filtration and dried at 60° C. under reduced pressure. The yield of polymer amounted to 60.4 g. The polymerization activity was 18,300 g polymer/g solid catalyst/hour and 154,000 g polymer/g transition metal/hour. The polymer had a melt index of 0.59 g/10 minutes, MFR of 56, and bulk density of 0.41 g/cm³. The polymer powder was approximately spherical in particle shape and showed a narrow particle size distribution and good flowability.

EXAMPLE 2

The polymerication of ethylene was carried out in the same manner as in Example 1 (4), except that 1.0 mmol of triethylaluminum was used in place of the triisobutylaluminum and 3.5 mg of the solid catalyst component was used. There were obtained 56.7 g of the polymer. The catalyst activity was 16,200 g polymer/g solid catalyst/hour and 136,000 g polymer/g transition metal/hour. The MI of the polymer was 1.2 g/10 minutes, MFR 51, and the bulk density 0.40 g/cm³. The particles of the polymer powder were approximately spherical and showed a narrow particle size distribution and good flowability.

EXAMPLE 3

The polymerization of ethylene was carried out in the same manner as in Example 1 (4), except that there were used 1.0 mmol of diethylaluminum monochloride in place of the triisobutylaluminum, 11.5 mg of the solid catalyst component, a hydrogen pressure of 10 kg/cm², and a total pressure of 20 kg/cm². There were obtained 53.4 g of the polymer. The catalyst activity was 4,630 g polymer/g solid catalyst/hour and 38,900 g polymer/g transition metal/hour. The polymer had a MI of 0.31 g/10 minutes, MFR of 60 and a bulk density of 0.42 g/cm³. The polymer powder was approximately spherical in particle shape and showed a markedly narrow particle size distribution and good flowability.

EXAMPLE 4

Into a 1-liter autoclave provided with an electromagnetic induction stirrer, which had been thoroughly flushed with nitrogen, were charged 50 ml of n-heptane, 1.0 mmol of triisobutylaluminum and 10 g of butene-1. Into the autoclave, after the temperature had been elevated to 80° C., was charged hydrogen to a total pressure of 2 kg/cm² followed by ethylene to a total pressure of 12 kg/cm². The polymerization was initiated by the addition of 2.7 mg of the solid catalyst component prepared in Example 1 (3). Ethylene was charged continuously to the autoclave to maintain the total pressure constant at 80° C. for 1 hour to effect the copolymerization of ethylene with butene-1. After completion of the polymerization, the copolymer which was formed was collected by filtration and dried at 60° C. under reduced pressure. The yield of copolymer was 58.9 g. The catalyst activity was 21,800 g polymer/g solid catalyst/hour and 183,000 g polymer/g transition metal/hour. The copolymer contained 4.2 ethyl groups per 1,000 carbon atoms. It showed a density of 0.941 g/cm³, MI of 0.48 g/10 minutes, MFR of 53 and a bulk density of 0.42 g/cm³. The polymer powder was approximately spherical in particle shape and showed a narrow particle size distribution and good flowability.

COMPARATIVE EXAMPLE 1

The polymerization of ethylene was carried out in the same manner as in Example 1 (4), except that 17.8 mg of the intermediate product (II) prepared in Example 1 (2) was used as the solid catalyst component. There was obtained only a trace amount of a polymer.

COMPARATIVE EXAMPLE 2

The polymerization of ethylene was carried out in th same manner as in Example 3, except that 13.1 mg of the intermediate product (II) prepared in Example 1 (2) was used as the solid catalyst component. There was obtained 28.0 g of a polymer. The catalyst activity was 2,140 g polymer/g solid catalyst/hour and 23,000 g polymer/g transition metal/hour. The polymer had MI of 0.67 g/10 minutes, MFR of 34, and a bulk density of 0.24 g/cm³. As compared with the results obtained in Example 3, the catalyst activity was inferior and the polymer powder was inferior in bulk density and flowability and showed a narrower molecular weight distribution.

COMPARATIVE EXAMPLE 3

(1) Synthesis of solid catalyst component

To a solution of 21.8 g (105 mmol) of Si(OC₂H₅)₄ in 30 ml of n-heptane, while being maintained at 5° C., was added dropwise over a period of 35 minutes 51.6 ml (105 mmol n-C₄H₉MgCl) of a di-n-butyl ether solution containing n-C₄H₉MgCl prepared in Example 1 (1). The mixture was then allowed to continue the reaction at room temperature for 2 more hours. The liquid phase was then removed by filtration and the solid phase was washed 5 times with 120 ml of n-heptane and dried at room temperature under reduced pressure to yield 13.3 g of a white powder. To a 6.1 g portion of the white powder, was added dropwise 18 ml of TiCl₄ at room temperature over a period of 30 minutes. The mixture was then brought to 100° C. and allowed to react for one hour. After completion of the reaction, the liquid phase was removed by filtration and the solid phase was washed 5 times with 120 ml of n-heptane and dried at room temperature under reduced pressure to yield 5.8 g of a pale yellow powder which, upon analysis, was found to contain 6.0% by weight of titanium.

(2) Polymerization of ethylene

The polymerization of ethylene was carried out in the same manner as in Example 1 (4), except that 3.9 mg of the pale yellow powder obtained above in (1) was used as the solid catalyst component. There were obtainted 52.3 g of a polymer. The catalyst activity was 12,400 g polymer/g solid catalyst/hour and 207,000 g polymer/g transition metal/hour. The polymer had MI of 0.62 g/10 minutes, MFR of 37 and a bulk density of 0.29 g/cm³. The molecular weight distribution was narrow and the polymer powder was unsatisfactory in bulk density and flowability.

COMPARATIVE EXAMPLE 4

(1) Synthesis of solid catalyst component

To a solution of 10.0 g (29.3 mmol) of Ti(O-n-C$_4$H$_9$)$_4$ in 30 ml of n-heptane, was added 18.3 ml [29.3 mmol Zr(O-n-C$_4$H$_9$)$_4$] of a solution of Zr(O-n-C$_4$H$_9$)$_4$ in n-heptane. The mixture was stirred for 10 minutes at room temperature. To the mixture, while being maintained at 5° C., was added dropwise over a period of 35 minutes 28.8 ml (58.6 mmol n-C$_4$H$_9$MgCl) of a solution of n-C$_4$H$_9$MgCl prepared in Example 1 (1) in n-butyl ether. With the dropwise addition, the reaction mixture turned brown and a solid product was formed. After completion of the addition, the mixture was allowed to continue the reaction at room temperature for two more hours. The liquid phase was then removed by filtration, and the solid product was washed 5 times with 200 ml of n-heptane and dried at room temperature under reduced pressure to yield 13.2 g of a brown powder. A 5.7 g portion of the powder was weighed out and 17 ml of TiCl$_4$ was added thereto dropwise at room temperature over a period of 30 minutes. After the addition was completed, the mixture was brought to 100° C. and was allowed to react for one hour. After completion of the reaction, the liquid phase was removed by filtration and the solid product was washed 5 times with 60 ml of n-heptane and dried at room temperature under reduced pressure to yield 4.3 g of a brown powder which was found, upon analysis, to contain 11.2% by weight of titanium and 16.9% by weight of zirconium.

(2) Polymerization of ethylene

The polymerization of ethylene was carried out in the same manner as in Example 1 (4), except that 4.3 mg of the brown powder was used as the solid catalyst component. There were obtained 61.5 g of a polymer. The catalyst activity was 14,300 g polymer/g solid catalyst/hour and 59,900 g polymer/g transition metal/hour. The polymerization activity per g transsition metal was unsatisfactory. The polymer was found to have MI of 0.38 g/10 minutes, MFR of 44, and a bulk density of 0.26 g/cm$^3$. The polymer was unsatisfactory with respect to the bulk density and flowability.

COMPARATIVE EXAMPLE 5

(1) Synthesis of solid catalyst component

A solid catalyst component was prepared by use of the same compounds in the same ratios as in Example 1 (2) and (3), but by a different procedure for synthesizing the intermediate product (II).

To a solution of 9.15 g (43.9 mmol) of Si(OC$_2$H$_5$)$_4$ in 30 ml of n-heptane, while being maintained at 5° C., was added dropwise over a period of 35 minutes 30.3 ml (61.5 mmol n-C$_4$H$_9$MgCl) of the n-butyl ether solution of n-C$_4$H$_9$MgCl prepared in Example 1 (1). With the dropwise addition, there was formed a white solid product. After the addition, the mixture was allowed to continue the reaction for another hour at 5° C. To the resulting suspension, while being maintained at 5° C., was added dropwise over a period of 30 minutes 10 ml of a n-heptane solution containing 8.7 mmol of Ti(O-n-C$_4$H$_9$)$_4$ and 8.7 mmol of Zr(O-n-C$_4$H$_9$)$_4$ which had been prepared in advance. With the dropwise addition, the suspension was turned brown. After completion of the addition, the mixture was allowed to continue the reaction for 2 more hours at room temperature. The liquid phase was removed by filtration and the solid product was washed 5 times with 120 ml of n-heptane and dried at room temperature to yield 9.4 g of a brown powder which was found, upon analysis, to contain 3.5% by weight of titanium and 5.4% by weight of zirconium. A 5.3 g portion of the brown powder was weighed out and 16 ml of titanium tetrachloride was added dropwise thereto at room temperature over a period of 30 minutes. After the addition, the mixture was brought to 100° C. and was allowed to react for one hour. After completion of the reaction, the liquid phase was removed by filtration and the solid product was washed 5 times with 60 ml of n-heptan and dried at room temperature under reduced pressure to yield 4.1 g of a brown powder which was found, upon analysis, to contain 9.3% by weight of titanium and 9.3% by weight of zirconium.

(2) Polymerization of ethylene

The polymerization of ethylene was carried out in the same manner as in Example 1 (4), except that 8.0 mg of brown powder synthesized above in (1) was used as the solid catalyst component. There were obtained 83.2 g of a polymer. The catalyst activity was 10,400 g polymer/g solid catalyst/hour and 83,900 g polymer/g transition metal/hour. The polymer was found to have MI of 0.51 g/10 minutes, MFR of 38, and a bulk density of 0.23 g/cm$^3$. The polymer had a narrow molecular weight distribution and the polymer powder showed a broad particle size distribution and was unsatisfactory in bulk density and powder flowability.

EXAMPLES 5 to 12

In a manner similar to that in Example 1, various solid catalyst components were prepared from various compounds and the polymerization of ethylene was carried out in the presence of these solid catalyst components. The conditions for the preparation of these solid catalyst components were as shown in Table 1 and the results of ethylene polymerization were as shown in Table 2.

TABLE 1

| | Preparation of intermediate product (II) | | | | | | |
|---|---|---|---|---|---|---|---|
| | Component (A) | | Component (B) | | Component (C) | | |
| Example No. | Compound | Amount used (Si gram atom) | Compound | Amount used (mol) | Compound (reaction medium) | Amount used (mol) | Reaction medium |
| 5 | Si(OEt)$_4$ | 0.066 | Ti(O—n-Bu)$_4$ Zr(O—n-Bu)$_4$ | 0.006 0.060 | n-BuMgCl ((n-Bu)$_2$O) | 0.132 | n-heptane |
| 6 | SiCl$_4$ | 0.095 | Zr(O—n-Bu)$_4$ | 0.019 | n-BuMgCl ((n-Bu)$_2$O) | 0.114 | " |
| 7 | Si(OEt)$_4$ | 0.090 | Ti(O—n-Bu)$_4$ | 0.030 | n-BuMgCl ((n-BU)$_2$O) | 0.120 | " |
| 8 | Si(O—i-Pr)$_4$ | 0.085 | Ti(O—n-Pr)$_4$ | 0.014 | i-PrMgCl | 0.170 | Toluene |

TABLE 1-continued

| | | | | | | | | |
|---|---|---|---|---|---|---|---|---|
| 9 | [(CH₃)₃Si]₂O | 0.06 | Zr(O—n-Pr)₄<br>Ti(OEt)₄<br>Zr(O—n-Pr)₄ | 0.071<br>0.006<br>0.030 | ((i-Pr)₂O)<br>n-BuMgCl<br>((n-Bu)₂O) | 0.096 | (n-Bu)₂O |
| 10 | Dimethylpoly-<br>siloxane<br>(25° C., 100 cSt) | 0.150 | Ti(OEt)₄<br>VO(OEt)₃ | 0.015<br>0.015 | n-BuMgCl<br>((n-Bu)₂O) | 0.180 | n-heptane |
| 11 | Methylhydro-<br>genpolysilo-<br>xane<br>(25° C., 30 cSt) | 0.060 | VO(OEt)₃ | 0.030 | n-BuMgCl<br>(tetrahydro-<br>furan) | 0.090 | " |
| 12 | Si(OEt)₄ | 0.070 | Ti(O—n-Bu)₄<br>Zr(O—n-Bu)₄ | 0.012<br>0.058 | (n-Bu)Mg<br>(sec-Bu)<br>(n-heptane) | 0.140 | " |

| | Preparation of hydro-<br>carbon insoluble<br>product (III) | | | Transition |
|---|---|---|---|---|
| | Component (D) | | | metal content |
| Example<br>No. | Compound | Amount used<br>(mmol/g<br>product (II) | Reaction medium | of product (III)<br>(% by weight) |
| 5 | TiCl₄ | 20 | — | Ti 10.2<br>Zr 13.4 |
| 6 | " | 15 | — | Ti 3.3<br>Zr 9.3 |
| 7 | " | 20 | Toluene | Ti 6.2 |
| 8 | Ti(OC₆H₅)₃Cl | 15 | Chlorobenzene | Ti 3.2<br>Zr 7.3 |
| 9 | TiCl₄ | 20 | — | Ti 5.3<br>Zr 10.2 |
| 10 | " | " | — | Ti 5.7<br>V 3.2 |
| 11 | Ti(OC₆H₅)₃Cl | 15 | Chlorobenzene | Ti 3.1<br>V 6.3 |
| 12 | TiCl₄ | 20 | — | Ti 4.0<br>Zr 14.1 |

Note:
Et = C₂H₅, n-Pr = n-C₃H₇, i-Pr = iso-C₃H₇, n-Bu = C₄H₉, sec-Bu = sec-C₄H₉

TABLE 2

| Example<br>No. | Amount<br>of<br>solid<br>catalyst<br>component<br>(mg) | Organo-<br>metallic<br>compound | Poly-<br>meriza-<br>tion<br>temp.<br>(°C.) | Yield<br>of<br>poly-<br>mer<br>(g) | Catalyst activity | | Bulk<br>density<br>(g/cm³) | MI<br>(g/10 min.) | MFR |
|---|---|---|---|---|---|---|---|---|---|
| | | | | | g polymer/<br>g solid<br>catalyst/<br>hour | g polymer/g<br>transition<br>metal/hour | | | |
| 5 | 3.7 | Triisobutyl-<br>aluminum | 80 | 58.8 | 15,900 | 67,300 | 0.40 | 0.35 | 63 |
| 6 | 2.7 | Triisobutyl-<br>aluminum | " | 60.5 | 22,400 | 178,000 | 0.39 | 0.62 | 57 |
| 7 | 3.1 | Triisobutyl-<br>aluminum | " | 59.2 | 19,100 | 308,000 | 0.40 | 0.65 | 33 |
| 8 | 4.1 | Triisobutyl-<br>aluminum | " | 61.9 | 15,100 | 144,000 | 0.39 | 0.27 | 54 |
| 9 | 3.4 | Triisobutyl-<br>aluminum | " | 56.7 | 16,700 | 108,000 | 0.41 | 0.39 | 48 |
| 10 | 3.3 | Triisobutyl-<br>aluminum | " | 64.0 | 19,400 | 218,000 | 0.39 | 0.59 | 46 |
| 11 | 3.5 | Triisobutyl-<br>aluminum | " | 57.1 | 16,300 | 173,000 | 0.36 | 0.61 | 40 |
| 12 | 3.9 | Triisobutyl-<br>aluminum | " | 53.8 | 13,800 | 76,200 | 0.33 | 0.40 | 51 |

COMPARATIVE EXAMPLE 6

(1) Synthesis of solid catalyst component

In the systhesis of solid catalyst component, the same compounds and the same material ratios as in Example 12 were used, but the procedure for the systhesis of intermediate product (II) was different.

To a solution of 5.0 g (67.4 mmol in terms of silicon atom) of dimethylpolysiloxane (100 centistokes in viscosity at 25° C.) in 30 ml of n-heptane, while being maintained at 5° C., was added dropwise over a period of 35 minutes 39.9 ml (80.9 mmol n-C₄H₉MgCl) of the di-n-buthyl ether solution of n-C₄H₉MgCl prepared in Example 1 (1). With the dropwise addition, there was formed a white solid product. After the addition, the mixture was allowed to continue the reaction at 5° C. for another hour. To the resulting suspension, while being maintained at 5° C., was added dropwise over a period of 30 minutes 10 ml of a n-heptane solution containing each 6.74 mmol of Ti(OC₂H₅)₄ and VO-(OC₂H₅)₃. With the dropwise addition, the suspension of reaction mixture turned brown. After the addition, the mixture was allowed to continue the reaction at room temperature for 2 more hours. The liquid phase was then removed by filtration and the solid phase was washed 5 times with 120 ml of n-heptane and dried at room temperature under reduced pressure to yield 9.1 g of a brown powder which, upon analysis, was found to contain 2.8% by weight of titanium and 3.5% by weight of vanadium. To a 6.1 g of portion of the powder, was added at room temperature dropwise 16.8 ml of TiCl$_4$ over a period of 30 minutes. The mixture was then brought to 100° C. and allowed to react for another hour. After completion of the reaction, the liquid phase was removed by filtration and the solid phase was washed 5 times with 60 ml of n-heptane and dried at room temperature under reduced pressure to yield 4.0 g of a brown powder which, upon analysis, was found to contain 7.2% by weight of titanium and 3.4% by weight of vanadium.

(2) Polymerization of ethylene

The polymerization was carried out in the same manner as in Example 1 (4), except that 7.1 mg of the brown powder prepared above in (1) was used as the solid catalyst component. There were formed 68.9 g of a polymer. The catalyst activity was 9,700 g polymer/g solid catalyst/hour and 91,500 g polymer/g transition metal/hour. The polymer showed MI of 0.57 g/10 minutes, MFR of 37, a bulk density of 0.24, and a narrow molecular weight distribution. The polymer powder showed a broad particle size distribution and was very unsatisfactory in bulk density and powder flowability.

EXAMPLE 13

(1) Synthesis of organomagnesium compound

A di-n-buthyl ether solution of n-C$_4$H$_9$MgCl (2.03 mol/liter) was prepared in a similar manner to Example 1 (1).

(2) Synthesis of reaction mixture (I) and intermediate product (II)

To a solution of 7.47 g (21.9 mmol) of Ti(O-n-C$_4$H$_9$) in 150 ml of n-heptane, was added 58.7 ml [109 mmol Zr(O-n-C$_4$H$_9$)$_4$] of a solution of Zr(O-n-C$_4$H$_9$)$_4$ in n-heptane. The mixture was stirred at room temperature for 10 minutes. To the mixture, was added dropwise 27.3 g (131 mmol) of Si(OC$_2$H$_5$)$_4$ over a period of 15 minutes at room temperature. The mixture was stirred at room temperature for 20 minutes to form a pale yellow homogeneous solution [reaction mixture (I)]. To the reaction mixture (I), while being maintained at 5° C., was added dropwise over a period of two hours 129 ml (262 mmol n-C$_4$H$_9$MgCl) of the di-n-buthyl ether solution of n-C$_4$H$_9$-MgCl prepared above in (1). With the dropwise addition, the reaction mixture turned brown and a solid product was formed. After the addition, the mixture was allowed to continue the reaction at 5° C. for another hour, then at room temperature for 2 more hours. The liquid phase was then removed by filtration and the solid phase was washed 5 times with 250 ml of n-heptane and dried at room temperature under reduced pressure to yield 60.6 g of a brown powder [intermediate product (II)] which, upon analysis, was found to contain 2.1% of titanium, 17.2% of zirconium, 11.6% of magnesium, 16.1% of chlorine, and 0.7% of di-n-buthyl ether (all percentages are by weight).

(3) Synthesis of solid catalyst component

To a mixture of 50 g of the intermediate product (II) prepared above in (2) and 145 ml of n-heptane, was added at 60° C. dropwise over a period of 3 hours 289 ml (1 mol C$_2$H$_5$AlCl$_2$) of a solution of C$_2$H$_5$AlCl$_2$ in n-heptane. The mixture was then allowed to react at 65° C. for one hour. After completion of the reaction, the liquid phase was removed by filtration and the solid phase was washed 5 times with 250 ml of n-heptane and dried at room temperature under reduced pressure to yield 35 g of a brownish black powder [product (IV)] which, upon analysis, was found to contain 2.3% of titanium, 18.0% of zirconium, 8.9% of magnesium, 54.0% of chlorine, and 3.4% of aluminum (all percentages are by weight). To a 3.0 g portion of the product (IV), was added at room temperature 15 ml (137 mmol) of TiCl$_4$. The mixture was brought to 100° C. and allowed to react for one hour. After completion of the reaction, the liquid phase was removed by filtration and the solid phase was washed 5 times with 80 ml of n-heptane and dried at room temperature under reduced pressure to yield 4.0 g of a brown powder [product(III)] which, upon analysis, was found to contain 11.4% of titanium, 10.3% of zirconium, 6.2% of magnesium, 60.3% of chlorine, and 1.8% of aluminum (all percentages are by weight). The powder gave an X-ray diffraction diagram in which only weak and broad diffraction peaks were observable at interplanar spacings (d) of about 5.9, 2.8 and 1.8 Å. The powder particles were found by microscopic examination to be approximately spherical in shape and of narrow particle size distribution.

(4) Polymerization of ethylene

Into a 1-liter autoclave provided with an electromagnetic induction stirrer, which had been thoroughly flushed with nitrogen, were charged 500 ml of n-heptane and 1.0 mmol of triisobutylaluminum. After the internal temperature had been elevated to 80° C., hydrogen was charged to a total pressure of 5 kg/cm$^2$ followed by ethylene to a total pressure of 15 kg/cm$^2$. The polymerization was initiated by adding 3.6 mg of the solid catalyst component [product (III)] prepared above in (3). The polymerization was allowed to continue at 80° C. for one hour, while feeding ethylene continuously to keep the total pressure constant. After completion of the polymerization, the polymer was collected by filtration and dried at 60° C. under reduced pressure to yield 65.8 g of a polymer. The polymerization activity was 18,300 g polymer/g solid catalyst/hour and 84,200 g polymer/g transition metal/hour. The polymer showed MI of 0.41 g/10 minutes, MFR of 84, and bulk density of 0.39 g/cm$^3$. The polymer particles were approximately spherical and of a narrow particle size distribution indicative of good flowability.

EXAMPLE 14

The polymerization of ethylene was carried out in the same manner as in Example 13, except that 1.0 mmol of triethylaluminum was used in place of the triisobutylaluminum and the amount of the solid catalyst component was 4.1 mg. There were obtained 63.6 g of a polymer. The catalyst activity was 15,500 g polymer/g solid catalyst/hour and 71,500 g polymer/g transition metal/hour. The polymer showed MI of 0.33 g/10 minutes, MFR of 78, and a bulk density of 0.38 g/cm$^3$. The polymer particles were approximately spherical in shape and of a narrow particle size distribution indicative of a good flowability.

EXAMPLE 15

The polymerization of ethylene was carried out in the same manner as in Example 13 (4), except that 1.0 mmol of diethylaluminum monochloride was used in place of the triisobutylaluminum, the amount used of the solid catalyst component was 10.0 mg, and the hydrogen pressure and total pressure were 10 kg/cm$^2$ and 20 kg/cm$^2$, respectively. There were obtained 57.9 g of a polymer. The catalyst activity was 5,790 g polymer/g solid catalyst/hour and 26,700 g polymer/g transition metal/hour. The polymer showed MI of 0.25 g/10 minutes, MFR of 67, and a bulk density of 0.41 g/cm$^3$. The polymer particles were approximately spherical and of a very narrow particle size distribution indicative of a good flowability.

EXAMPLE 16

Into a 1-liter autoclave provided with an electromagnetic induction stirrer, which had been thoroughly flushed with nitrogen, were charged 200 g of butane, 1.0 mmol of triisobutylalunimum, and 50 g of butene-1. After the internal temperature had been elevated to 70° C., hydrogen was charged to a total pressure of 5 kg/cm$^2$ and ethylene was then fed to a total pressure of 15 kg/cm$^2$. Polymerization was initiated by the addition of 3.4 mg of the solid catalyst component [product (III)] prepared in Example 13 (3). The copolymerization of ethylene and butene-1 was allowed to proceed at 70° C. for one hour, while maintaining the total pressure constant by the continuous feeding of ethylene. After completion of the polymerization, the polymer formed was collected by filtration and dried at 60° C. under reduced pressure. The yield of polymer was 60.7 g. The catalyst activity was 17,900 g polymer/g solid catalyst/hour and 82,300 g polymer/g transition metal/hour. The copolymer contained 18.4 ethyl groups per 1,000 carbon atoms and showed a density of 0.925 g/cm$^3$, MI of 0.39 g/10 minutes, MFR of 85, and a bulk density of 0.37 g/cm$^3$. The polymer particles were approximately spherical and of a narrow particle size distribution indicating good flowability.

Comparative Example 7

The polymerization of ethylene was carried out in the same manner as in Example 13 (4), except that 17.0 mg of the intermediate product (II) prepared in Example 13 (2) was used as the solid catalyst component. Only a trace amount of polymer was obtained.

Comparative Example 8

The polymerization of ethylene was carried out in the same manner as in Example 13 (4), except that 8.9 mg of the product (IV) prepared in Example 13 (2) was used as the solid catalyst component. There were obtained 54.3 g of a polymer. The catalyst activity was 6,100 g polymer/g solid catalyst/hour and 28,100 g polymer/g transition metal/hour. The polymer showed MI of 0.08 g/10 minutes, MFR of 92, and a bulk density of 0.39 g/cm$^3$.

EXAMPLES 17 to 20

A series of hydrocarbon-insoluble products (III) were prepared using the reaction product (IV) prepared in Example 13 and varied amounts of titanium tetrachloride. n-Heptane was used as the reaction medium in an amount of 4.5 ml for 1 g of the reaction product (IV). Titanium tetrachloride was added to the product (IV) at room temperature and the mixture was treated at 80° C. for one hour. The solid product which was formed was washed with n-heptane and dried at room temperature under reduced pressure. Using the resulting solid catalyst component, ethylene was polymerized as in Example 13 (4). The conditions for the preparation of solid catalyst conponent [product (III)] and the results of ethylene polymerization were as shown in Table 3.

EXAMPLE 21 to 30

In a manner similar to that in Example 13, solid catalyst components were prepared using various compounds. The conditions for the synthesis and the results of ethylene polymerization were as shown in Tables 4 and 5, repectively.

TABLE 3

| | Preparation of product (III) | | | Polymerization of ethylene | | | | | |
|---|---|---|---|---|---|---|---|---|---|
| Example No. | Amount of TiCl$_4$ used [mmol/g product (IV)] | Transition metal content of product (III) (% by weight) | | Amount of solid catalyst component (mg) | Yield of polymer (g) | Catalyst activity | | Bulk density (g/cm$^3$) | MI (g/10 min.) | MFR |
| | | | | | | g Polymer/ g solid catalyst/ hour | g Polymer/g transition metal/hour | | | |
| 17 | 10 | Ti | 11.3 | 3.5 | 63.2 | 18,100 | 84,800 | 0.39 | 0.40 | 86 |
| | | Zr | 10.0 | | | | | | | |
| 18 | 4 | Ti | 10.6 | 3.8 | 59.5 | 15,700 | 69,300 | 0.40 | 0.38 | 90 |
| | | Zr | 12.0 | | | | | | | |
| 19 | 2 | Ti | 9.9 | 3.9 | 54.7 | 14,000 | 60,200 | 0.39 | 0.27 | 98 |
| | | Zr | 13.4 | | | | | | | |
| 20 | 0.5 | Ti | 5.0 | 5.6 | 57.0 | 10,200 | 48,200 | 0.39 | 0.13 | 104 |
| | | Zr | 16.1 | | | | | | | | good flowability.

TABLE 4

| | Preparation of product (II) | | | | | | |
|---|---|---|---|---|---|---|---|
| | Component (A) | | Component (B) | | Component (C) | | |
| Example No. | Compound | Amount used (Si gram atom) | Compound | Amount used (mol) | Compound (reaction medium) | Amount used (mol) | Reaction medium |
| 21 | Si(OEt)$_4$ | 0.131 | Ti(O—n-Bu)$_4$ | 0.022 | n-BuMgCl | 0.262 | n- |

TABLE 4-continued

| Example No. | | | | | | | |
|---|---|---|---|---|---|---|---|
| 22 | " | " | Zr(O—n-Bu)₄<br>Ti(O—n-Bu)₄<br>Zr(O—n-Bu)₄ | 0.109<br>0.022<br>0.109 | ((n-Bu)₂O)<br>n-BuMgCl<br>((n-Bu)₂O) | " | heptane<br>n-heptane |
| 23 | Si(O—n-Bu)₄ | 0.085 | Ti(O—n-Bu)₄<br>Zr(O—n-Bu)₄ | 0.028<br>0.057 | n-BuMgCl<br>((n-Bu)₂O) | 0.170 | n-heptane |
| 24 | " | 0.080 | Ti(O—n-Bu)₄ | 0.016 | n-BuMgCl<br>((n-Bu)₂O) | 0.096 | n-heptane |
| 25 | " | " | Zr(O—n-Bu)₄ | " | n-BuMgCl<br>((n-Bu)₂O) | " | n-heptane |
| 26 | SiCl₄ | " | Ti(O—n-Bu)₄<br>Zr(O—n-Pr)₄ | 0.020<br>0.060 | (n-Bu)Mg<br>(sec-Bu)<br>(n-heptane) | 0.180 | n-heptane |
| 27 | Dimethyl-<br>polysiloxane<br>(25° C., 100 cSt) | " | Ti(OEt)₄<br>VO(OEt)₃ | 0.040<br>0.040 | n-BuMgCl<br>(Tetrahydro-<br>furan) | 0.160 | Toluene |
| 28 | [(CH₃)₃Si]₂O | 0.085 | TiCl₄<br>Zr(O—n-Pr)₄ | 0.028<br>0.057 | i-PrMgCl<br>((i-Pr)₂O) | 0.096 | (n-Bu)₂O |
| 29 | SiCl₄ | 0.090 | TiCl₄ | 0.030 | n-BuMgCl<br>((n-Bu)₂O) | 0.120 | n-heptane |
| 30 | " | 0.100 | " | 0.050 | n-BuMgCl<br>((n-Bu)₂O) | 0.150 | n-heptane |

| | Preparation of product (IV) | | | Preparation of product (III) | | | |
|---|---|---|---|---|---|---|---|
| | Component (E) | | | Component (D) | | | Transition metal content of product (III) (% by weight) |
| Example No. | Compound | Amount used [mmol/g product (II)] | Reaction medium | Compound | Amount used [mmol/g product (IV)] | Reaction medium | |
| 21 | EtAlCl₂ | 15 | n-heptane | TiCl₄ | 46 | — | Ti 11.0<br>Zr 10.0 |
| 22 | " | 25 | n-heptane | " | " | — | Ti 11.5<br>Zr 10.7 |
| 23 | " | 20 | n-heptane | " | " | — | Ti 10.8<br>Zr 9.8 |
| 24 | " | " | n-heptane | " | " | — | Ti 10.4 |
| 25 | " | " | n-heptane | " | " | — | Ti 8.7<br>Zr 11.2 |
| 26 | i-BuAlCl₂ | 15 | n-heptane | " | " | — | Ti 10.2<br>Zr 10.7 |
| 27 | Et₂AlCl | 30 | Toluene | Ti(OC₆H₅)Cl₃ | 10 | Chloro-benzene | Ti 12.3<br>V 5.7 |
| 28 | EtAlCl₂ | 20 | " | TiCl₄ | 10 | n-heptane | Ti 10.9<br>Zr 10.1 |
| 29 | " | " | n-heptane | Zr(O—n-Bu)₂Cl₂ | 20 | — | Ti 8.4<br>Zr 5.3 |
| 30 | " | " | n-heptane | VOCl₃ | " | n-heptane | Ti 9.5<br>V 4.0 |

Note:
Et = C₂H₅, n-Pr = n-C₃H₇, i-Pr = iso-C₃H₇, n-Bu = n-C₄H₉, sec-Bu = sec-C₄H₉, i-Bu = iso-C₄H₉

TABLE 5

| Example No. | Amount of solid catalyst component (mg) | Organo-metallic compound | Polymeriza-tion temp (°C.) | Yield of polymer (g) | Catalyst activity | | Bulk density (g/cm³) | MI (g/10 min.) | MFR |
|---|---|---|---|---|---|---|---|---|---|
| | | | | | g polymer/ g solid catalyst/hour | g polymer/g transition metal/hour | | | |
| 21 | 3.0 | Triisobutyl-aluminum | 80 | 57.3 | 19,100 | 91,000 | 0.40 | 0.60 | 68 |
| 22 | 4.1 | Triisobutyl-aluminum | " | 50.8 | 12,400 | 55,800 | 0.39 | 0.11 | 90 |
| 23 | 2.7 | Triisobutyl-aluminum | " | 55.2 | 20,400 | 99,200 | 0.40 | 0.55 | 71 |
| 24 | 2.5 | Triisobutyl-aluminum | " | 60.5 | 24,200 | 233,000 | 0.40 | 1.03 | 39 |
| 25 | 3.7 | Triisobutyl-aluminum | " | 53.6 | 14,500 | 72,800 | 0.39 | 0.24 | 95 |
| 26 | 2.5 | Triisobutyl-aluminum | " | 54.6 | 21,800 | 104,000 | 0.34 | 0.60 | 62 |
| 27 | 3.6 | Triisobutyl-aluminum | " | 51.0 | 14,200 | 78,700 | 0.34 | 0.83 | 50 |
| 28 | 3.8 | Triisobutyl-aluminum | " | 59.3 | 15,600 | 74,300 | 0.38 | 0.39 | 75 |
| 29 | 4.6 | Triisobutyl-aluminum | " | 58.5 | 12,700 | 92,800 | 0.35 | 0.26 | 54 |
| 30 | 4.0 | Triisobutyl- | " | 52.9 | 13,200 | 98,000 | 0.33 | 1.27 | 51 |

TABLE 5-continued

| Example No. | Amount of solid catalyst component (mg) | Organometallic compound | Polymerization temp (°C.) | Yield of polymer (g) | Catalyst activity | | Bulk density (g/cm³) | MI (g/10 min.) | MFR |
| --- | --- | --- | --- | --- | --- | --- | --- | --- | --- |
| | | | | | g polymer/g solid catalyst/hour | g polymer/g transition metal/hour | | | |
| | | aluminum | | | | | | | |

What is claimed is:

1. A solid catalyst component for olefin polymerization comprising a hydrocarbon-insoluble product (III) obtained by reacting
(A) a silicon compound selected from the group consisting of
   (1) silicon compounds represented by the general formula $R^1_aR^2_bR^3_c Si$, wherein $R^1$, $R^2$ and $R^3$ are each an alkyl, cycloalkyl, aralkyl, aryl, alkoxy, aryloxy, or hydroxyl group or a halogen or hydrogen atom; and a, b and c are numbers defined by the formulas $0 \leq a \leq 4$, $0 \leq b \leq 4$, $0 \leq c \leq 4$ and $a+b+c=4$; and
   (2) silicon compounds containing the linkage Si-O-Si and polymers thereof
with
(B) a compound of a transition metal of Groups IVa, Va and VIa of the periodic table to form a reaction mixture (I) further reacting the reaction mixture (I) with
(C) an organomagnesium compound selected from simple organomagnesium compounds and hydrocarbon-soluble complexes thereof with an organometallic compound capable of solubilizing said organomagnesium compounds to produce an intermediate product (II), and contacting the intermediate product (II) with
(D) a halogen-containing compound of a transition metal of Groups IVa, Va and VIa of the periodic table, to form the hydrocarbon-insoluble product (III).

2. A solid catalyst component for olefin polymerization according to claim 1, wherein a reaction product (IV) produced by the reaction of the intermediate product (II) and (E) an organoaluminum halide represented by the general formula $R^4_l AlX_{3-l}$ (wherein $R^4$ is an organic group having 1 to 20 carbon atoms, X is a halogen atom, and l is a number defined by the formula $0 < l < 3$) is contacted with (D) a halogen-containing compound of a transition metal of Groups IVa, Va and VIa of the periodic table.

3. A solid catalyst component for olefin polymerization according to claim 1, wherein the component (A) is a silicon compound of the general formula $R^1_a R^2_b R^3_c Si$ (wherein $R^1$ is an alkoxy or aryloxy group, $R^2$ is a halogen atom, and a, b and c are numbers defined by the formulas $0 \leq a \leq 4$, $0 \leq b \leq 4$, $a+b=4$ and $c=0$).

4. A solid catalyst component for olefin polymerization according to claim 3, wherein the component (A) is a tetraalkoxysilane or tetraaryloxysilane.

5. A solid catalyst component for olefin polymerization according to claim 3, wherein the component (A) is silicon tetrachloride.

6. A solid catalyst component for olefin polymerization according to claim 1, wherein the component (A) is a polysiloxane.

7. A solid catalyst component for olefin polymerization according to claim 1, wherein the component (B) is a compound represented by the general formula $[M^1 O_p(OR^5)_q X_r]_m$, wherein $M^1$ is a transition metal of Groups IVa, Va and VIa of the Periodic Table, $R^5$ is an alkyl, cycloalkyl, aryl, aralkyl, alkenyl, or acyl group or substitution derivative thereof having 1 to 20 carbon atoms, X is a halogen atom, p is a number defined by for formula $0 \leq p \leq 1.5$, q and r are numbers defined by the formulas $0 \leq q \leq 4$, and $0 \leq r \leq 4$ and m is an integer.

8. A solid catalyst component for olefin polymerization according to claim 7, wherein $M^1$ is an element selected from titanium, vanadium, zirconium and hafnium.

9. A solid catalyst component for olefin polymerization according to claim 7, wherein $M^1$ is selected from titanium and zirconium.

10. A solid catalyst component for olefin polymerization according to claim 7, a combination of two or more compounds containing different transition metals ($M^1$) is used as the component (B).

11. A solid catalyst component for olefin polymerization according to claim 10, wherein a combination of titanium and zirconium or of titanium and Vanadium is used as the transition metal ($M^1$).

12. A solid catalyst component for olefin polymerization according to claim 11, wherein the atomic ratio of titanium to zirconium is from 1:50 to 50:1.

13. A solid catalyst component for olefin polymerization according to claim 11, wherein the atomic ratio of titanium to zirconium is from 1:20 to 20:1.

14. A solid catalyst component for olefin polymerization according to claim 11, wherein the atomic ratio of titanium to zirconium is from 1:10 to 10:1.

15. A solid catalyst component for olefin polymerization according to claim 1, wherein the component (C) is a compound represented by the general formula $R^6 MgX$, wherein $R^6$ is a hydrocarbon radical having 1 to 20 carbon atoms and X is a halogen atom, or $R^7 R^8 Mg$, wherein $R^7$ and $R^8$ are each a hydrocarbon radical having 1 to 20 carbon atoms.

16. A solid catalyst component for olefin polymerization according to claim 15, wherein the component (C) is used in the form of ether solution or ether complex.

17. A solid catalyst component for olefin polymerization according to claim 16, wherein the ether is an ether having 6 or more carbon atoms or an ether having a cyclic structure.

18. A solid catalyst component for olefin polymerization according to claim 1, wherein the component (D) is a compound represented by the general formula $[M^2 O_s(OR^9)_t X_u]_n$, wherein $M^2$ is a transition metal of Groups IVa, Va and VIa of the Periodic Table, $R^9$ is an alkyl, cycloalkyl, aryl, aralkyl, alkenyl, or acyl group or substitution derivative thereof having 1 to 20 carbon atoms, X is a halogen atom, s is a number defined by the formula $0 \leq s \leq 1.5$, t is a number defined by the formula $0 \leq t \leq 3$, u is a number defined by the formula $1 \leq u \leq 4$, and n is an integer.

19. A solid catalyst component for olefin polymerization according to claim 18, wherein $M^2$ is an element selected from titanium, vanadium, zirconium and hafnium.

20. A solid catalyst component for olefin polymerization according to claim 18, wherein $M^2$ is selected from titanium and zirconium.

21. A solid catalyst component for olefin polymerization according to claim 18, wherein $M^2$ is titanium.

22. A solid catalyst component for olefin polymerization according to claim 1, wherein the component (D) is titanium tetrachloride.

23. A solid catalyst component for olefin polymerization according to claim 2, wherein the component (E) is an alkylaluminum dichloride represented by the general formula $R^4AlCl_2$, wherein $R^4$ is an alkyl group having 1 to 20 carbon atoms.

24. A solid catalyst component for olefin polymerization according to claim 2, wherein the component (E) is ethylaluminum dichloride.

25. A solid catalyst component for olefin polymerization according to claim 2, wherein the component (E) is isobutylaluminum dichloride.

26. A solid catalyst component for olefin polymerization according to claim 1, wherein the intermediate product (II) is isolated from the reaction mixture.

27. A solid catalyst component for olefin polymerization according to claim 2, wherein the reaction product (IV) is isolated from the reaction mixture.

28. A solid catalyst component for olefin polymerization according to claim 1, wherein the ratio of the component (A) in terms of silicon atom to the component (B) in terms of transition metal atom is in the range of from 1:50 to 50:1.

29. A solid catalyst component for olefin polymerization according to claim 1, wherein the ratio of the component (A) in terms of silicon atom to the component (B) in terms of transition metal atom is in the range of from 1:20 to 20:1.

30. A solid catalyst component for olefin polymerization according to claim 1, wherein the ratio of the reaction mixture (I) in terms of the sum of silicon atom and transition metal atom to the component (C) in terms of magnesium atom is in the range of from 1:2 to 2:1.

31. A solid catalyst component for olefin polymerization according to claim 1, wherein the quantity of the component (D) for 1 g of the intermediate product (II) is in the range of from 0.01 to 10 mols.

32. A solid catalyst component for olefin polymerization according to claim 2, wherein the quantity of the component (E) in terms of halogen atom for 1 g of the intermediate product (II) is in the range of from 0.01 to 0.1 gram equivalent.

33. A solid catalyst component for olefin polymerization according to claim 2, wherein the quantity of the component (D) for 1 g of the reaction product (IV) is in the range of from 1 mmol to 0.1 mol.

34. A process for the preparation of a solid catalyst component for olefin polymerization, which comprises reacting (A) a silicon compound selected from the group consisting of
 (1) silicon compounds represented by the general formula $R^1{}_aR^2{}_bR^3{}_cSi$, wherein $R^1$, $R^2$ and $R^3$ are each an alkyl, cycloalkyl, aralkyl, aryl, alkoxy, aryloxy, or hydroxyl group or a halogen or hydrogen atom; and a, b and c are numbers defined by the formulas $0 \leq a,b,c \leq 4$ and $a+b+c=4$; and
 (2) silicon compounds containing the linkage Si-O-Si and polymers thereof with (B) a compound of a transition metal of Groups IVa, Va and VIa of the periodic table to form a reaction mixture (I), further reacting the reaction mixture (I) with (C) an organomagnesium compound selected from simple organomagnesium compounds and hydrocarbon-soluble complexes thereof with an organometallic compound capable of solubilizing said organomagnesium compounds to produce an intermediate product (II), and contacting the intermediate product (II) with (D) a halogen-containing compound of a transition metal of Groups IVa, Va and VIa of the periodic table, to form a hydrocarbon-insoluble product (III) to be used as the solid catalyst component.

35. A process for the preparation of a solid catalyst component for olefin polymerization according to claim 34, wherein the intermediate product (II) is reacted with (E) an organoaluminum halide represented by the general formula $R^4{}_lAlX_{3-l}$, wherein $R^4$ is an organic group having 1 to 20 carbon atoms, X is a halogen atom, and l is a number defined by the formula $0<l<3$, and the resulting reaction product (IV) is contacted with (D) a halogen-containing compound of a transition metal of Groups IVa, Va and VIa of the periodic table.

36. A solid catalyst component for olefin polymerization according to claim 2, wherein the component (a) is a silicon compound of the general formula $R^1{}_aR^2{}_bR^3{}_cSi$ (wherein $R^1$ is an alkoxy or aryloxy group, $R^2$ is a halogen atom, and a, b and c are numbers defined by the formulas $0 \leq a \leq 4$, $0 \leq b \leq 4$, $a+b=4$ and $c=0$).

37. A solid catalyst component for olefin polymerization according to claim 36, wherein the component (A) is a tetraalkoxysilane or tetraaryloxysilane.

38. A solid catalyst component for olefin polymerization according to claim 36, wherein the component (A) is silicon tetrachloride.

39. A solid catalyst component for olefin polymerization according to claim 2, wherein the component (A) is a polysiloxane.

40. A solid catalyst component for olefin polymerization according to claim 2, wherein the component (B) is a compound represented by the general formula $[M^1O_{p-}(OR^5)_qX_r\pi_m]$, wherein $M^1$ is a transition metal of Groups IVa, Va and VIa of the Periodic Table, $R^5$ is an alkyl, cycloalkyl, aryl, aralkyl, alkenyl, or acyl group or substitution derivative thereof having 1 to 20 carbon atoms, X is a halogen atom, p is a number defined by the formula $0 \leq p \leq 1.5$, q and r are numbers defined by the formulas $0 \leq q \leq 4$, and $0 \leq r \leq 4$, and m is an integer.

41. A solid catalyst component for olefin polymerization according to claim 40 wherein $M^1$ is an element selected from titanium, vanadium, zirconium and hafnium.

42. A solid catalyst component for olefin polymerization according to claim 40 wherein $M^1$ is selected from titanium and zirconium.

43. A solid catalyst component for olefin polymerization according to claim 40, wherein a combination of two or more compounds containing different transition metals ($M^1$) is used as the component (B).

44. A solid catalyst component for olefin polymerization according to claim 43, wherein a combination of titanium and zirconium or of titanium and vanadium is used as the transition metal ($M^1$).

45. A solid catalyst component for olefin polymerization according to claim 44, wherein the atomic ratio of titanium to zirconium is from 1:50 to 50:1.

46. A solid catalyst component for olefin polymerization according to claim 44, wherein the atomic ratio of titanium to zirconium is from 1:20 to 20:1.

47. A solid catalyst component for olefin polymerization according to claim 44, wherein the atomic ratio of titanium to zirconium is from 1:10 to 10:1.

48. A solid catalyst component for olefin polymerization according to claim 2, wherein the component (C) is a compound represented by the general formula $R^6MgX$, wherein $R^6$ is a hydrocarbon radical having 1 to 20 carbon atoms and X is a halogen atom, or $R^7R^8Mg$, wherein $R^7$ and $R^8$ are each a hydrocarbon radical having 1 to 20 carbon atoms.

49. A solid catalyst component for olefin polymerization according to claim 48, wherein the component (C) is used in the form of ether solution or ether complex.

50. A solid catalyst component for olefin polymerization according to claim 49, wherein the ether is an ether having 6 or more carbon atoms or an ether having a cyclic structure.

51. A solid catalyst component for olefin polymerization according to claim 2, wherein the component (D) is a compound represented by the general formula $[M^2O_s(OR^9)_tX_u]_n$, wherein $M^2$ is a transition metal of Groups IVa, Va and VIa of the Periodic Table, $R^9$ is an alkyl, cycloalkyl, aryl, aralkyl, alkenyl, ar acyl group or substitution derivative thereof having 1 to 20 carbon atoms, X is a halogen atom, s is a number defined by the formula $0 \leq s \leq 1.5$, t is a number defined by the formula $0 \leq t \leq 3$, u is a number defined by the formula $1 \leq u \leq 4$, and n is an integer.

52. A solid catalyst component for olefin polymerization according to claim 51, wherein $M^2$ is an element selected from titanium, vanadium, zirconium and hafnium.

53. A solid catalyst component for olefin polymerization according to claim 51, wherein $M^2$ is selected from titanium and zirconium.

54. A solid catalyst component for olefin polymerization according to claim 51, wherein $M^2$ is titanium.

55. A solid catalyst component for olefin polymerization according to claim 2, wherein the component (D) is titanium tetrachloride.

56. A solid catalyst component for olefin polymerization according to claim 2, wherein the intermediate product (II) is isolated from the reaction mixture.

57. A solid catalyst component for olefin polymerization according to claim 2, wherein the ratio of the component (A) in terms of silicon atom to the component (B) in terms of transition metal atom is in the range of from 1:50 to 50:1.

58. A solid catalyst component for olefin polymerization according to claim 2, wherein the ratio of the component (A) in terms of silicon atom to the component (B) in terms of transition metal atom is in the range of from 1:20 to 20:1.

59. A solid catalyst component for olefin polymerization according to claim 2, wherein the ratio of the reaction mixture (I) in terms of the sum of silicon atom and transition metal atom to the component (C) in terms of magnesium atom is in the range of from 1:2 to 2:1.

60. A solid catalyst component for olefin polymerization according to claim 2, wherein the quantity of the component (D) for 1 g of the intermediate product (II) is in the range of from 0.01 to 10 mols.

* * * * *